UNITED STATES PATENT OFFICE.

JOHN E. SIEBEL, OF CHICAGO, ILLINOIS.

IMPROVEMENT IN DEPILATING HIDES.

Specification forming part of Letters Patent No. 116,638, dated July 4, 1871; reissue No. 4,549, dated September 12, 1871.

DIVISION A.

*To all whom it may concern:*

Be it known that I, JOHN E. SIEBEL, of Chicago, in the county of Cook and State of Illinois, have invented an Improved Process of Depilating Hides, of which the following is a specification:

The bluish-green mass which is produced in the purification of illuminating-gas, and which is considered a very obnoxious refuse by gas-makers, I term refuse gas-lime, a name by which this substance is generally known. This substance consists of sulphide and sulphydrate of calcium and small quantities of the lime salts of carbonic and sub-sulphurous acid. The two first-named ingredients—viz., the sulphide and sulphydrate of calcium—render this substance applicable for the purpose specified herein. For this purpose the refuse gas-lime (as soon as possible after it leaves the refining apparatus of the gas-works) is either extracted by water or mixed with the same to a milky liquid, into which the hides are immersed until the hair becomes loose and can be removed by a blunt knife. The refuse gas-lime may also be mixed with water to a thick paste-like mass, which is spread and left upon the hides until the desired object is attained.

What I claim is—

The use of refuse gas-lime as a depilatory, especially for the use of tanneries.

Witnesses: JOHN E. SIEBEL.

A. C. LEBELL,

OTTO PELTZER. (57.)